US 6,592,284 B1

(12) United States Patent
Rechtien et al.

(10) Patent No.: US 6,592,284 B1
(45) Date of Patent: Jul. 15, 2003

(54) METHOD FOR PRODUCING A LOW-FRICTION BALL JOINT AND A BALL JOINT PRODUCED ACCORDING TO THIS METHOD

(75) Inventors: Martin Rechtien, Neuenkirchen-Vörden (DE); Martin Wellerding, Damme (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/831,704

(22) PCT Filed: Sep. 7, 2000

(86) PCT No.: PCT/DE00/03091

§ 371 (c)(1),
(2), (4) Date: Jul. 18, 2001

(87) PCT Pub. No.: WO01/18412

PCT Pub. Date: Mar. 15, 2001

(30) Foreign Application Priority Data

Sep. 9, 1999 (DE) .......................................... 199 43 194

(51) Int. Cl.$^7$ .......................... B65D 59/00; F16D 1/00; F16C 11/00; B21D 39/00; B21D 53/10
(52) U.S. Cl. .......................... 403/12; 403/27; 403/122; 29/511; 29/898.09
(58) Field of Search .............................. 403/11, 12, 27; 29/407.08, 441.1, 511, 898.09; 73/118.1, 862.041, 862.042, 862.191, 862.21, 862.23

(56) References Cited

U.S. PATENT DOCUMENTS

| | | | |
|---|---|---|---|
| 3,430,327 A | | 3/1969 | Herbenar |
| 3,857,149 A | | 12/1974 | Hassan |
| 3,999,872 A | * | 12/1976 | Allison .................... 242/147 R |
| 4,286,363 A | * | 9/1981 | Morin .......................... 29/446 |
| 4,559,692 A | * | 12/1985 | Morin .................... 29/243.517 |
| 4,790,682 A | | 12/1988 | Henkel |
| 4,848,950 A | * | 7/1989 | Haberstroh .................. 403/12 |

(List continued on next page.)

FOREIGN PATENT DOCUMENTS

| | | |
|---|---|---|
| DE | 39 30 825 | 9/1990 |
| DE | 42 07 602 | 9/1992 |
| DE | 196 25 351 | 11/1997 |
| EP | 0 345 452 | 12/1989 |

OTHER PUBLICATIONS

Patent Abstracts of Japan, vol. 1996, No. 07, Mar. 31, 1997, Europe.

(List continued on next page.)

*Primary Examiner*—Anthony Knight
*Assistant Examiner*—Michael J. Kyle
(74) *Attorney, Agent, or Firm*—McGlew and Tuttle, P.C.

(57) ABSTRACT

A process for manufacturing a low-friction ball-and-socket joint is provided in which a ball pivot with a pivot area and with a joint ball made in one piece therewith is first introduced into a bearing shell (2, 2.1, 2.2) and the latter is in turn introduced through an opening (4) into a joint housing (5), wherein the opening (4) of the housing (3) is closed by a housing cover (5) after the introduction of the components. The pivot area (1.1) of the ball pivot (1) is then introduced into a recording device of a torque measuring device to determine the torque of the joint between the bearing shells (2.1,2.2) and the joint ball (1.2). The housing cover (5) is then permanently fixed by a rolling device (10) by bending over a rolled edge (9) of the housing arranged on the housing (3). The torque of the joint is continuously measured during the rolling operation and is compared with a presettable set point. The housing cover (5) displaces the upper bearing shell (2.2) in the axial direction against the joint ball (1.2) and generates a pressing force, which is partially compensated by a support element (6) at the housing cover (5). The rolling process is immediately terminated when the set point of the torque of the joint is reached.

14 Claims, 3 Drawing Sheets

U.S. PATENT DOCUMENTS

| | | | |
|---|---|---|---|
| 4,875,794 A | | 10/1989 | Kern, Jr. |
| 5,484,218 A | * | 1/1996 | Fellows ...................... 277/635 |
| 5,498,092 A | * | 3/1996 | Fellows ...................... 277/635 |
| 5,501,107 A | * | 3/1996 | Snyder et al. ........... 73/862.23 |
| 5,531,534 A | * | 7/1996 | Urbach ...................... 277/635 |
| 5,772,337 A | | 6/1998 | Maughan et al. |
| 5,904,436 A | * | 5/1999 | Maughan et al. .......... 29/441.1 |
| 6,196,071 B1 | * | 3/2001 | Shomo ...................... 173/176 |

OTHER PUBLICATIONS

Patent Abstracts of Japan, vol. 1997, No. 03, Mar. 31, 1997, Europe.

* cited by examiner

METHOD FOR PRODUCING A LOW-FRICTION BALL JOINT AND A BALL JOINT PRODUCED ACCORDING TO THIS METHOD

FIELD OF THE INVENTION

The present invention pertains to a process for preparing a low-friction ball-and-socket joint as well as to a ball-and-socket joint prepared according to this process with a ball pivot, with a pivot area and with a joint ball made in one piece therewith, wherein the joint ball is accommodated in a bearing shell made of an elastic material and the bearing shell is accommodated in a housing closed with a housing cover.

BACKGROUND OF THE INVENTION

Many ball-and-socket joint s are used in all areas of mechanical engineering, especially in the automobile industry. Such joint s comprise, in general, a ball pivot with a pivot area and a joint ball made in one piece therewith, where the joint ball is accommodated in a two-part bearing shell made of an elastic material and the bearing shell is in turn accommodated in a housing closed with a housing cover.

The assembly is usually carried out by permanently closing the ball pivot housing by means of the housing cover after the introduction of the ball pivot and the bearing shells by permanently fixing the cover of the housing by means of a rolling means by bending over a rolled edge of the housing arranged on the housing. A pressing force, which guarantees the absence of clearance between the bearing shell and the joint ball, which are components movable in relation to one another, is generated by the rolling of the housing cover between the bearing shell and the joint ball. Thus, the pressing force generated during the rolling operation essentially determines the degree of smooth running of the ball pivot in relation to the bearing shell.

Experience has shown that the ball-and-socket joint s manufactured in the manner described in the introduction have a relatively great dispersion in terms of the forces and torques necessary for the rotation or tilting of the ball pivot. To diminish the drawbacks in terms of differences in the smooth running of the ball-and-socket joint, it is common practice for many ball-and-socket joint s to artificially age the ball-and-socket joint within the framework of a tempering operation. The ball-and-socket joint s are now exposed to increased temperature (about 60–80° C.) over a certain period in order to bring about a reduction of stress peaks within the ball-and-socket joint in this manner.

SUMMARY AND OBJECTS OF THE INVENTION

Based on this state of the art, a technical object of the present invention is to provide a process for manufacturing low-friction ball-and-socket joint s by which a moment of friction of the joint that can be set constantly between the parts of the ball-and-socket joint movable in relation to one another can be guaranteed after the assembly in the ball-and-socket joint s manufactured according to this process and which can also be integrated within existing production lines without problems.

In addition, the basic technical object of the present invention is to provide a ball-and-socket joint manufactured according to the process according to the present invention, which has a permanently low coefficient of friction after the assembly, and the present invention covers all conventional designs of ball-and-socket joint s.

The process according to the present invention for manufacturing a low-friction ball-and-socket joint is characterized by the following process steps:

A ball pivot with a pivot area and a joint ball made in one piece therewith is first introduced into a bearing shell and the latter is in turn introduced through an opening into a joint housing, and the opening of the housing is covered with a cover after the introduction of the components.

The pivot area of the ball-and-socket joint is then introduced into a recording device of a torque measuring means to determine the torques of the joint between the bearing shells and the joint ball.

The cover of the housing is subsequently fixed permanently by means of a rolling means by bending over a rolled edge arranged on the housing, while the torque of the joint is measured continuously by the torque measuring means during the rolling operation and is compared with a presettable set point, and the housing cover now displaces the bearing shell in the axial direction against the joint ball and generates a pressing force, which is partially compensated by a support element at the housing cover. The pressing force increases continuously, while the feed of the rolling means decreases with increasing torque. The rolling means performs a predominantly axial feed motion and, during the deformation process, a rotating movement. When the set point of the torque of the joint is reached, the rolling process is terminated immediately.

Ball-and-socket joint s manufactured according to the process according to the present invention have a narrow tolerance range in terms of their joint torques compared with the state of the art, and due to its design, the relieving element contributes to reaching the set points preset on the torque measuring means by a defined deformation within the framework of the rolling operation.

It proved to be advantageous in this connection to design the relieving element at the housing cover as a circular support ring, which is supported at an edge of the housing and introduces at least part of the forces acting on the housing cover within the framework of the rolling operation directly into the housing. The support ring thus prevents an accidental deformation of the bearing shell and leads, in addition, to an improvement of the sealing of the ball-and-socket joint. Furthermore, a contact surface, via which the housing cover is in contact with the top side of the bearing shell, is provided concentrically to the support ring. It is, of course, also possible to make the support ring directly in one piece with the edge of the housing.

The conceivable special embodiments of the torque recording device are, e.g., a hexagon socket at the free end of the pivot area, a conical mount or a threaded hole. Reliable holding in the torque measuring means as well as sufficient torque transmission are guaranteed with all these embodiments. In addition, a hexagon socket can be prepared in the pivot area of the ball-and-socket joint at low cost.

The ball-and-socket joint according to the present invention comprises a ball pivot, which has a pivot area and a joint ball made in one piece therewith in the known manner. The joint ball is mounted in a bearing shell made of an elastic material. The inner surface of the bearing shell is adapted to the contour of the joint ball of the ball pivot. The bearing shell may have a cylindrical jacket surface on the outside and has a contact surface on the housing cover closing the housing on its upper side facing away from the pivot area.

According to the present invention, this housing cover has a relieving element for the partial transmission of the pressing forces occurring in connection with the rolling operation on the housing cover to the housing. This relieving element may be a circular support ring, but a separate sheet metal ring between the housing and the housing cover as well as a circular ring made of an elastic material, preferably rubber, are also conceivable.

The forces acting on the housing cover during the rolling operation bring about a controlled deformation of the support ring, so that the forces transmitted between the contact surface of the bearing shell and the housing cover are limited and the moment of friction generated by an axial displacement of the bearing shell during the rolling operation between the inner side of the bearing shell and the joint ball can be limited.

According to the present invention, the bearing shell may be divided in the axial longitudinal direction of the ball pivot or preferably at right angles to the axial longitudinal direction, which considerably facilitates the displacement of the bearing shell and increases its ability to be predetermined.

A mount, which may be designed, e.g., as a hexagon socket, a threaded hole or a conical seat, is located at the lower, free end of the ball pivot for fastening the pivot area in a torque measuring device.

A ball-and-socket joint of such a design makes it possible to use various bearing materials for the bearing shell and due to the development of a joint torque that is constant in different ball-and-socket joint s during the manufacturing process, it avoids a subsequent heat treatment, during which an artificial aging of the ball-and-socket joint is brought about by the reduction of stress peaks within the bearing shell. It is self-explanatory that the axial pretension between the bearing shell and the ball-and-socket joint reliably rules out an axial clearance of these two elements.

An exemplary embodiment of the ball-and-socket joint according to the present invention will be explained in greater detail below with reference to the attached drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
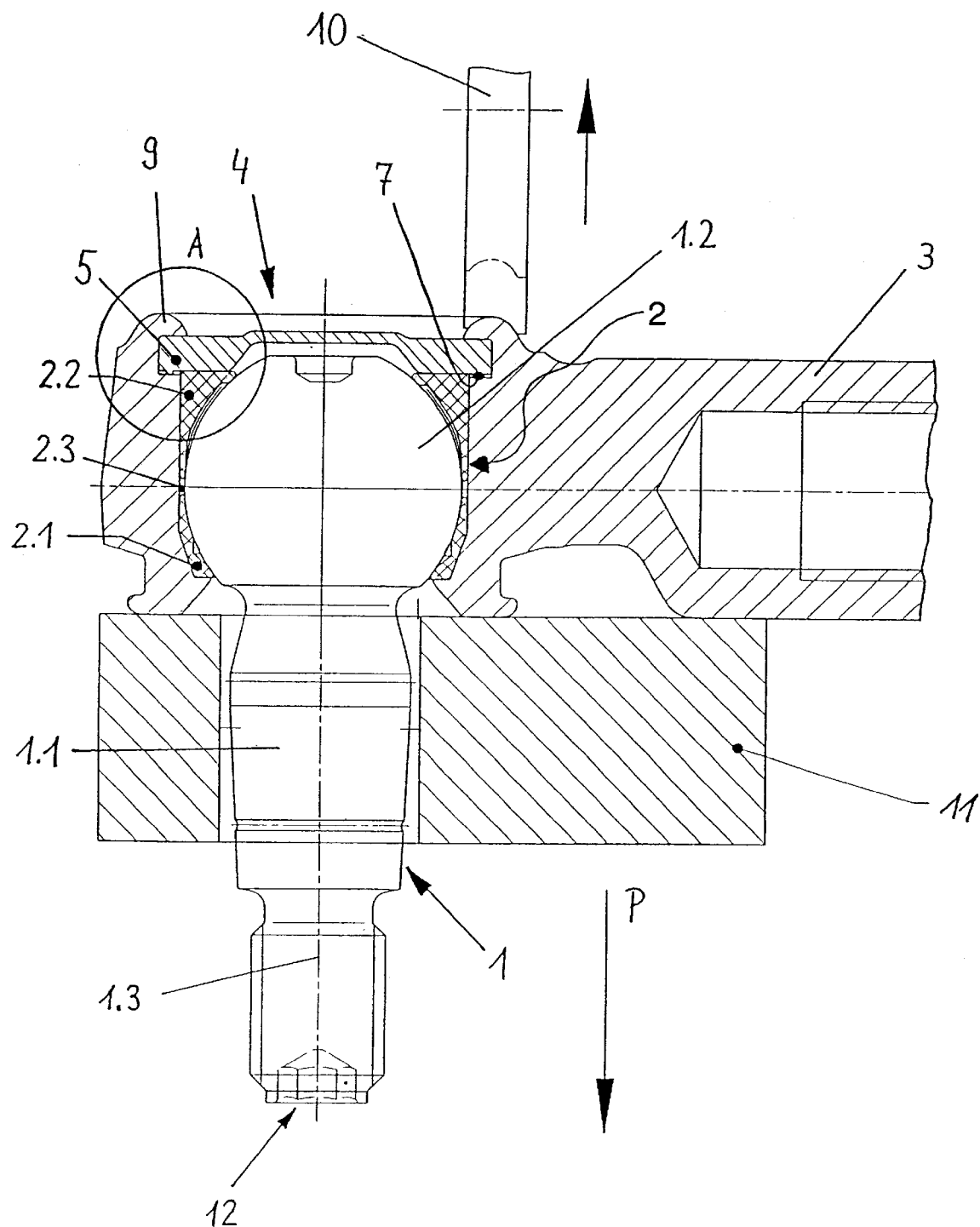
FIG. 1 is a sectional view of a ball-and-socket joint according to the present invention.

Referring to the drawings in particular, the ball-and-socket joint in FIG. 1 is shown schematically during the manufacturing process at the stage of the rolling of the housing cover with the housing.

Figure 2:
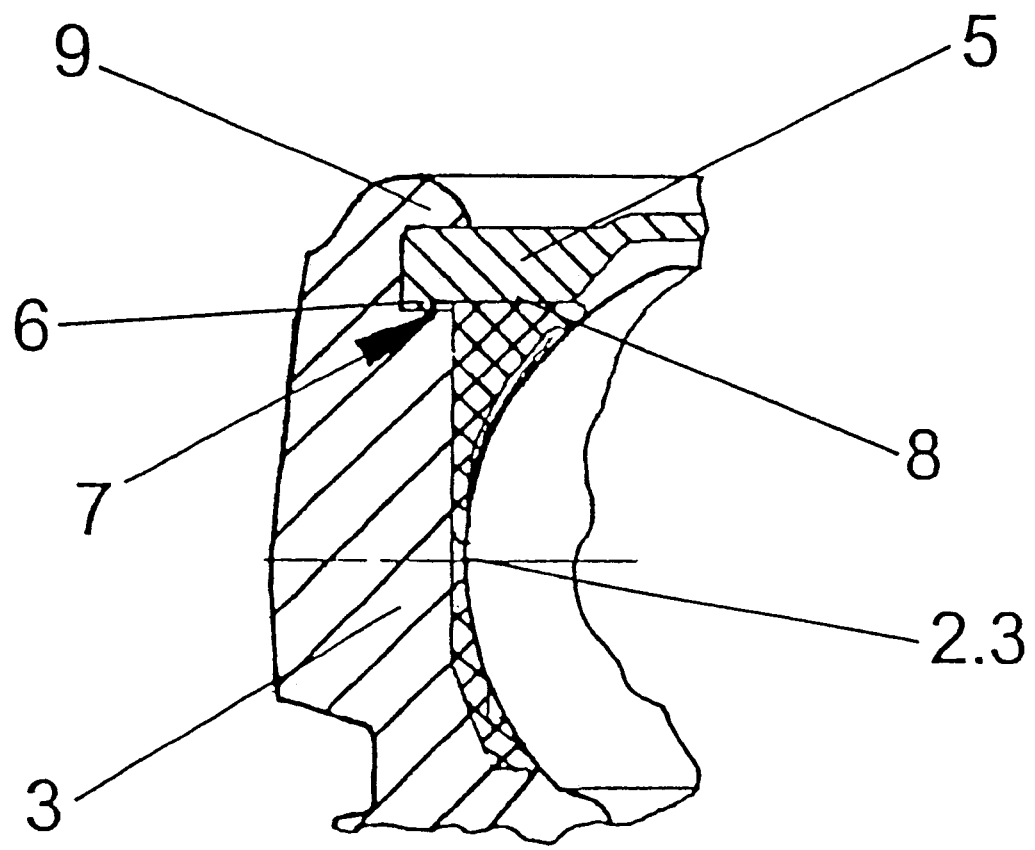
FIG. 2 is an enlarged sectional view of detail A from FIG. 1.

The ball-and-socket joint comprises a ball pivot 1, which has a pivot area 1.1 and a joint ball 1.2 made in one piece therewith in the known manner. The ball pivot 1 is mounted with its joint ball 1.2 in a bearing shell 2 made of an elastic material, the bearing shell 2 comprising a lower bearing shell 2.1 facing the pivot area 1.2 and an upper bearing shell 2.2, there being a distance 2.3, albeit small, between the two bearing shells in the direction of the longitudinal axis 1.3 of the ball pivot. The inner surface of the lower and upper bearing shells 2.1 and 2.2, respectively, is adapted to the contour of the joint ball 1.2. On the outer contour, the bearing shell 2 has a cylindrical jacket surface, with which it is accommodated in a housing 3. On its upper side facing away from the pivot area 1.1, the housing 3 has an opening 4, through which the different components of the ball-and-socket joint are introduced into the housing 3. After the introduction, the opening 4 is closed with a housing cover 5. As is clearly apparent from the enlarged view in FIG. 2, this housing cover 5 has a circular support ring 6, which is in contact with a circular shoulder 7 in the area of the opening of the housing 3. A contact surface 8, by which the housing cover 5 is in contact with the top side of the upper bearing shell 2.2, extends concentrically to the support ring 6.

To fix the housing cover 5 in the housing 3 after the introduction of the individual parts of the ball-and-socket joint, the housing cover 5 is fixed by bending over a rolled edge 9 of the housing arranged on the housing 3 by means of a rolling device or rolling means, which is schematically represented by the rolling die 10 in FIG. 1. The housing 3 of the ball-and-socket joint is supported on a lifting table 11 of the rolling means during the rolling operation.

As is apparent from FIG. 1, the ball pivot I has a torque recording device 12, which is designed as a hexagon socket in this special embodiment, at the lower, free end of its pivot area 1.1. Other possible embodiments of a torque recording device (a measuring interface) include, e.g., a conical mount or a threaded hole for the recording device 12. The torque recording device 12 is used to mount the ball pivot 1 in a usual torque measuring device, not shown here in detail.

Within the framework of the process according to the present invention, this torque measuring device is used for the continuous measurement of the joint torque of the ball pivot 1 between the joint ball 1.2 and the bearing shell 2 during the entire rolling operation on the housing cover 5. The torque measuring device is set to a set point of the joint torque before the beginning of the rolling operation. During the rolling operation, the support ring 6 of the housing cover 5 is specifically deformed, on the one hand, by pressing as a consequence of the rolling operation in order to thus absorb part of the rolling forces applied; at the same time, the housing cover 5 presses the top side of the upper bearing shell 2.2 with its contact surface 8 and displaces same in the direction of the longitudinal axis of the ball pivot. A pressing force, which determines the joint torque occurring in the ball-and-socket joint, is generated by this axial displacement between the upper bearing shell 2.2 and the joint ball 1.2. As soon as the measured joint torque agrees with the set point set on the torque measuring device, the lifting table 11 is displaced by an electronic control unit by a rapid movement in the direction of arrow P in FIG. 1, so that the opposing force against the rolling die 10 is eliminated. The pressing pressure between the rolling die 10 and the rolled edge 9 of the housing is instantaneously eliminated by this measure and a further increase in the torque of the joint is reliably prevented from occurring.

Figure 3:
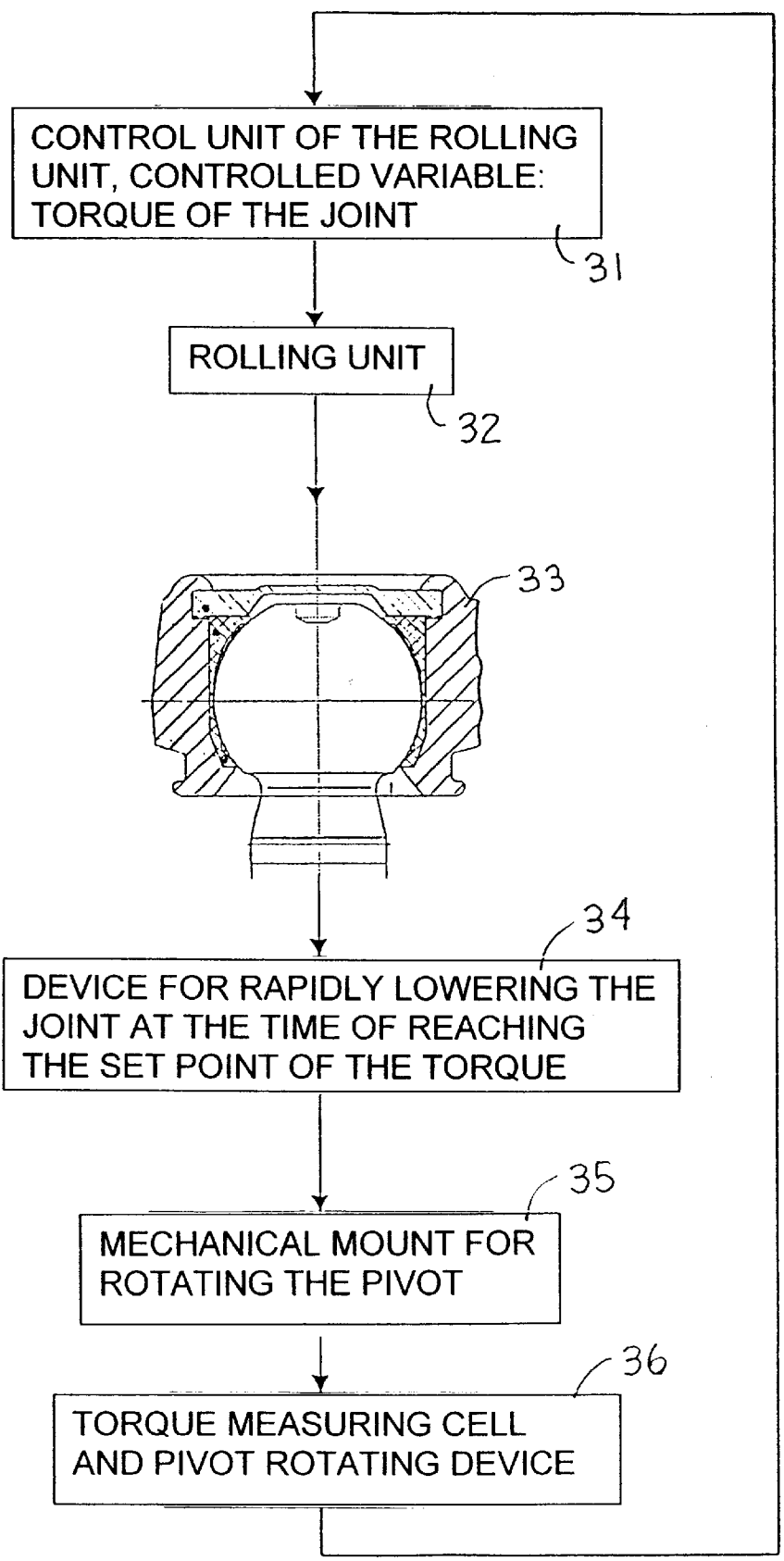
FIG. 3 is a schematic flow diagram illustrating steps of the process of the present invention.

The process described is schematically shown once again in FIG. 3 in order to illustrate the closed control circuit. At step 31 the control unit of the rolling unit is used with the controlled variable being the torque of the joint. The "rolling unit" at step 32 represents the component designated as rolling die 10 above. The ball-and-socket joint is shown at 33. The state of the lifting table 11 was mentioned above as an example of a "device for rapidly lowering the joint at the time of reaching the set point of the torque" as indicated at step 34. The providing of a "mechanical mount for rotating the pivot" of step 35 as well as the providing of a "torque measuring cell and pivot turning device" of step 36 together form the torque measuring means, which continuously compares the preset set points with the actual values on the ball-and-socket joint.

A joint torque at the level of a preset set point is thus reached in all ball-and-socket joint s manufactured according to the process according to the present invention, and the process is characterized by a narrow manufacturing tolerance in terms of the joint torques that occur. A tempering operation, within the framework of which the ball-and-socket joint s manufactured are aged in an additional manufacturing step by reducing stress peaks, becomes unnecessary in this manufacturing process, as a result of which the manufacturing costs obviously decrease.

While specific embodiments of the invention have been shown and described in detail to illustrate the application of the principles of the invention, it will be understood that the invention may be embodied otherwise without departing from such principles.

What is claimed is:

1. A process for manufacturing a low-friction ball-and-socket joint having a ball pivot with a pivot area and with a joint ball made in one piece therewith, the process comprising:

introducing the joint ball into a bearing shell;

introducing the bearing shell through an opening into a joint housing;

closing the opening of the housing with a housing cover after the introduction of the bearing shell and joint ball;

connecting the ball pivot to a recording device of a torque measuring device to determine the torque of the joint between the bearing shells and the joint ball;

permanently fixing the housing cover using a rolling device by bending over a rolled edge of the housing;

continuously measuring the torque of the joint during the rolling operation and comparing the measured torque with a presettable set point, wherein the housing cover displaces the upper bearing shell in an axial direction against the joint ball and generates a pressing force, which is partially compensated by a support element at the housing cover;

immediately terminating the rolling process when the set point of the torque of the joint is reached.

2. A ball-and-socket joint, comprising:

a ball pivot with a pivot area and with a joint ball made in one piece therewith;

a bearing shell, said joint ball being accommodated in said bearing shell made of an elastic material;

a housing; and a housing cover, said bearing shell being accommodated in said housing closed with said housing cover, said joint ball being introduced into said bearing shell and said bearing shell with joint ball being introduced through an opening into said housing, the opening of the housing being closed by the housing cover after the introduction of the bearing shell and joint ball, said ball pivot having a torque recording interface at a free end facing away from the joint ball, said ball pivot being connected to a recording device of a torque measuring device to determine the torque of the joint between the bearing shells and the joint ball while permanently fixing the housing cover using a rolling device by bending over a rolled edge of the housing to continuously measure the torque of the joint during the bending wherein the housing cover displaces the upper bearing shell in an axial direction against the joint ball and generates a pressing force, and the bending is terminated when a set point of the torque of the joint is reached, said housing cover having a relieving element for the partial transmission and compensation of the pressing forces acting on the housing, which are generated in connection with the bending on the housing cover.

3. A ball-and-socket joint in accordance with claim 2, wherein the bearing shell is divided.

4. A ball-and-socket joint in accordance with claim 3, wherein the bearing shell is divided in the axial longitudinal direction or at right angles to the axial longitudinal direction.

5. A ball-and-socket joint in accordance with claim 2, wherein the torque recording device includes a hexagon socket.

6. A ball-and-socket joint in accordance with claim 2, wherein the torque recording device includes a threaded hole.

7. A ball-and-socket joint in accordance with claim 2, wherein the relieving element on the housing cover is arranged as a separate sheet metal ring between the housing and the housing cover.

8. A ball-and-socket joint in accordance with claim 2, wherein the relieving element on the housing cover is a circular ring made of a permanently elastic material.

9. A ball-and-socket joint in accordance with claim 2, wherein the relieving element on the housing cover is a circular ring made of rubber.

10. A ball-and-socket joint, comprising:

a ball pivot with a pivot area and with a joint ball made in one piece therewith;

a bearing shell, said joint ball being accommodated in said bearing shell made of an elastic material;

a housing; and a housing cover, said bearing shell being accommodated in said housing closed with said housing cover, said joint ball being introduced into said bearing shell and said bearing shell with joint ball being introduced through an opening into said housing, the opening of the housing being closed by the housing cover after the introduction of the bearing shell and joint ball, said ball pivot having a torque recording interface at a free end facing away from the joint ball, said ball pivot being connected to a recording device of a torque measuring device to determine the torque of the joint between the bearing shells and the joint ball while permanently fixing the housing cover using a rolling device by bending over a rolled edge of the housing to continuously measure the torque of the joint during the bending wherein the housing cover displaces the upper bearing shell in an axial direction against the joint ball and generates a pressing force, and the bending is terminated when a set point of the torque of the joint is reached, said housing cover having a relieving element for the partial transmission and compensation of the pressing force acting on the housing, which are generated in connection with the bending on the housing cover, the relieving element on the housing cover includes a circular support ring.

11. A process for manufacturing a low-friction ball-and-socket joint having a ball pivot with a pivot area and with a joint ball made in one piece therewith, the process comprising:

introducing the joint ball into a bearing shell;

introducing the bearing shell through an opening into a joint housing;

closing the opening of the housing with a housing cover after the introduction of the bearing shell and joint ball;

connecting the ball pivot to a recording device of a torque measuring device to determine the torque of the joint between the bearing shells and the joint ball;

permanently fixing the housing cover using a rolling device by bending over a rolled edge of the housing;

continuously measuring the torque of the joint during the rolling operation and comparing the measured torque with a presettable set point, wherein the housing cover displaces the upper bearing shell in an axial direction against the joint ball and generates a pressing force, which is partially compensated by a support element at the housing cover;

immediately terminating the rolling process when the set point of the torque of the joint is reached by a separating movement of a lifting table arranged at the rolling device away from the rolling tool.

12. A process for manufacturing a ball-and-socket joint, the process comprising:

providing a joint housing defining a housing opening and having a housing edge around said housing opening;

providing a ball pivot with a pivot area and with a joint ball made in one piece therewith;

providing a bearing shell;

introducing the joint ball into the bearing shell;

introducing the bearing shell through the housing opening into the joint housing;

providing a housing cover across the housing opening;

bending said housing edge onto said housing cover to compress said bearing shell and vary a torque between said ball pivot and said housing, said bending also fixing said housing cover to said housing;

measuring the torque between the ball pivot and the housing during said bending;

stopping said bending when said torque equals a preset value.

13. A process in accordance with claim 12, wherein:

the housing cover includes a relieving element in contact with the housing;

the relieving element being deformable during said bending of the housing edge to limit compressing of the bearing shell in the housing.

14. A process in accordance with claim 1, wherein:

a support element is deformable during said bending of the rolled edge to limit compressing of the bearing shell in the housing.

* * * * *